United States Patent [19]

Kubota

[11] Patent Number: 4,679,442
[45] Date of Patent: Jul. 14, 1987

[54] ELECTROMAGNETIC FLOW METER

[75] Inventor: Yousuke Kubota, Fuchu, Japan

[73] Assignee: Kabushiki Kaisha Toshiba, Japan

[21] Appl. No.: 813,136

[22] Filed: Dec. 24, 1985

[30] Foreign Application Priority Data

Dec. 26, 1984 [JP] Japan ............................ 59-273491
Aug. 21, 1985 [JP] Japan ............................ 60-181881

[51] Int. Cl.$^4$ ............................................. G01F 1/58
[52] U.S. Cl. ............................................. 73/861.12
[58] Field of Search ............... 73/861.12, 273, 861.11, 73/861.13, 861.14, 861.15

[56] References Cited

U.S. PATENT DOCUMENTS

| | | | |
|---|---|---|---|
| 4,181,018 | 1/1980 | Schmoock | 73/861.12 |
| 4,186,600 | 2/1980 | Appel et al. | 73/861.12 |
| 4,253,340 | 3/1981 | Schmoock | 73/861.12 |
| 4,454,166 | 6/1984 | Reinhold et al. | 73/861.12 |

*Primary Examiner*—Charles A. Ruehl
*Attorney, Agent, or Firm*—Finnegan, Henderson, Farabow, Garrett & Dunner

[57] ABSTRACT

An electromagnetic flow meter comprises a detector body interposable between the flanged ends of upstream and downstream pipes conveying a fluid whose flow rate is to be measured and an outer casing. The detector body includes a measuring pipe made of a non-magnetic material and a pair of electrodes positioned on an imaginary straight line orthogonal to the axis of the measuring pipe and contacting the fluid to be measured. The detector body also includes a pair magnetic flux generating units having magnet cores with coils wound thereon. The axis of the magnet cores are positioned on an imaginary straight line that intersects, at right angles, both the imaginary line connecting the electrodes and the axis of the measuring pipe at a single point of intersection. The magnetic flux generating units generate magnetic field lines orthogonal to the imaginary line connecting the electrodes and the axis of the measuring pipe. The outer casing is split into two portions and houses the detector body after the detector body has been assembled. In one embodiment of the invention, the inner surface of the outer casing includes a plurality of radially inward pojections that abut against the measuring pipe. In an alternative embodiment, the measuring pipe includes a plurality of radially outward projections that abut against the outer casing.

11 Claims, 22 Drawing Figures

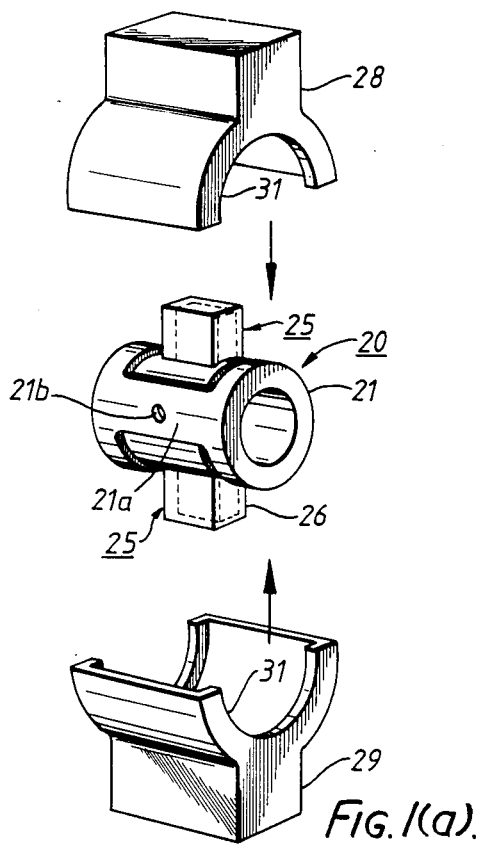
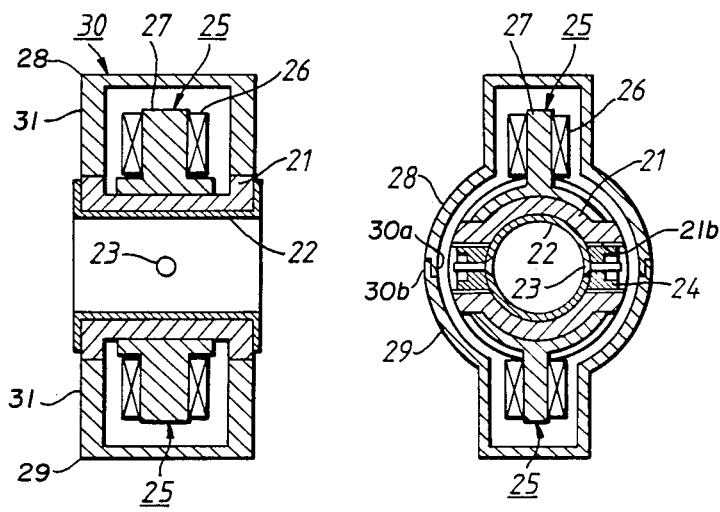
FIG.1(a).
FIG.1(b).   FIG.1(c).

ELECTROMAGNETIC FLOW METER

BACKGROUND OF THE INVENTION

1. Field of the Invention

The present invention relates to an electromagnetic flow meter that can be inserted and clamped between two flanges of piping conveying a fluid that is to be measured. More particularly, the present invention pertains to a structure for such an electromagnetic flow meter.

2. Description of the Prior Art

In constructing a conventional electromagnetic flow meter, a measuring pipe made of a non-magnetic metal is inserted through an opening in the axial end face of an outer casing made of a magnetic metal, and the end portions of the measuring pipe are secured to the outer casing by means of welding. Electrode bosses are inserted through an opening in the outer casing in a direction perpendicular to the axis of the measuring pipe and are welded to the measuring pipe. Insulating spacers then are threaded into the electrode bosses, and an insulating lining is provided on the inner surface of the measuring pipe. Then, electrodes are inserted into the insulating spacers from the inner surface of the measuring pipe and are secured. Thereafter, a pair of magnet cores provided with exciting coils are mounted by inserting them from the open ends of upper and lower magnetic flux generating unit housing portions, which are formed on the outer casing so as to extend orthogonally to the axis of the measuring pipe and to the electrodes.

After assembly, it is possible to confirm whether or not the structural symmetry required for the electromagnetic flow meter has satisfactorily been obtained only by visually checking the outside of the apparatus. The apparatus, however, is housed in the outer casing, and it is therefore difficult to effect any accurate confirmation. For this reason, it is necessary to increase substantially the degree of machining accuracy to ensure the required symmetry and reduce the distance between the upper and lower magnetic flux generating units, which fact inevitably increases the costs. Moreover, it is difficult to conduct such assembling operations as mounting the constituent elements and handling the lead wires extending from the electrodes and the magnetic fluix generating units, which must be carried out in the narrow space within the outer casing. It is therefore not easy to reduce the time required for assembly.

One example of a prior art electromagnetic flow meter that can be inserted and clamped between two flanges of piping conveying fluid to be measured is disclosed in U.S. Pat. No. 4,253,340. In this example, a splittable outer casing and the magnetic cores are integral with each other, and coils are mounted on the cores. Accordingly, although the outer casing comprises two splittable portions, and these portions are bonded together during assembly, it is still difficult to confirm the structural symmetry of the flow meter and reduce the distance between the upper and lower magnetic flux generating units, because the magnet cores are applied at the same time as the outer housing, which prevents the assembler from checking the accuracy of the assembly.

It is an object of the present invention to provide an electromagnetic flow meter which is so constructed that it is easy to obtain the required degree of assembling accuracy and symmetry among the measuring pipe, the electrodes, and the magnetic flux generating units.

It is another object of the present invention to provide an electromagnetic flow meter which is so constructed that it is easy to assemble the detector body and it is possible to reliably confirm the assembled condition.

It is still another object of the present invention to provide an electromagnetic flow meter which is so constructed that it is possible to reduce the size and weight of the flow meter.

It is a further object of the present invention to provide an electromagnetic flow meter which is so constructed that there is no need for conducting the operation of mounting various functional elements in a narrow space inside the outer casing, and it is therefore possible to remarkably improve the working efficiency.

Additional objects of the present invention will be set forth in part in the description that follows and in part will be obvious from that description or can be learned by practice of the invention. The objects of the invention can be realized and obtained by the apparatus particularly pointed out in the appended claims.

SUMMARY OF THE INVENTION

The present invention overcomes the problems of the prior art and achieves the objects listed above by providing an electromagnetic flow meter having a detector body that can be fully assembled before being housed within an outer casing.

To achieve the objects and in accordance with the purpose of the invention, as embodied and broadly described herein, the electromagnetic flow meter of the present invention is interposable between the flanged ends of upstream and downstream pipes conveying a fluid whose flow rate is to be measured and comprises a detector body including a measuring pipe made of non-magnetic material having longitudinal end faces contacting the flanged edges of the conveying pipes. The fluid to be measured flows through the measuring pipe along the axis of the measuring pipe. The detector body also includes a pair of electrodes mounted in the measuring pipe and positioned on a first imaginary straight line orthogonal to the axis of the measuring pipe, the electrodes contacting the fluid flowing through the measuring pipe. The detector body also includes a pair of magnetic flux generating units mounted on the outer surface of the measuring pipe, each of the magnetic flux generating units including a magnet core having coils wound thereon. Each of the magnet cores has an axis positioned on a second imaginary straight line that intersects, at right angles, both the first imaginary line connecting the electrodes and the axis of the measuring pipe at a common point of intersection. The magnetic flux generating units generate magnetic fluid lines orthogonal to the first imaginary line and the axis of the measuring pipe. The eletromagnetic flow meter also comprises an outer casing enclosing the radial portion of the detector body, the outer casing having longitudinal end faces substantially aligned with the longitudinal end faces of the measuring pipe.

In one embodiment of the invention, the inner surface of the outer casing includes a plurality of radially inward projections that abut against the measuring pipe. In an alternative embodiment, the measuring pipe includes a plurality of radially outward projections that abut against the outer casing.

Preferably, the outer casing is split into two portions along a plane that is orthogonal to the axis of the measuring pipe, a plane that is parallel with a plane including the axis of the measuring pipe and the first imaginary line connecting the electrodes, or a plane that is parallel with a plane including the axis of the measuring pipe and the second imaginary line connecting the axes of the magnet cores.

The accompanying drawings, which are incorporated in and constitute a part of this specification, illustrate at least one embodiment of the invention and, together with the description, explain the principles of the invention.

BRIEF DESCRIPTION OF THE DRAWINGS

FIG. 1(a) is an exploded perspective view of one embodiment of the flow meter of the present invention;

FIG. 1(b) is a sectional view of the flow meter of FIG. 1(a) after assembly, taken along a vertical plane containing the axis of the measuring pipe;

FIG. 1(c) is a sectional view of the flow meter of FIG. 1(a) after assembly, taken along a vertical plane perpendicular to the axis of the measuring pipe;

DESCRIPTION OF THE PREFERRED EMBODIMENTS

Reference now will be made in detail to the presently preferred embodiments of the invention, examples of which are illustrated in the accompanying drawings.

An electromagnetic flow meter in accordance with one embodiment of the present invention is shown in FIGS. 1(a), 1(b), 1(c) and 2. The electromagnetic flow meter comprises a detector body 20 housed in an outer casing 30. The detector body 20 includes a measuring pipe 21 made of a non-magnetic metal, for example, stainless steel.

Figure 2:
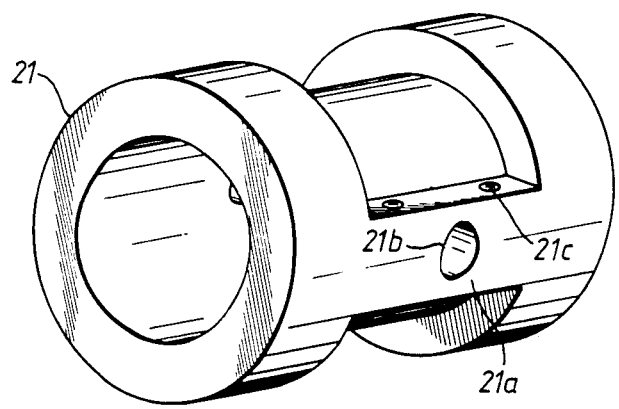
FIG. 2 is a perspective view of the measuring pipe of the flow meter shown in FIG. 1(a)

As seen best in FIG. 2, the measuring pipe 21 is so shaped that each of its end portions has a relatively large wall thickness so that the measuring pipe has a collar-like configuration. A pair of reinforcing portions 21a having the same wall thickness as that of the collar-like end portions are provided in symmetry with each other with respect to the axis of the pipe 21 on diametrally opposed sides of the pipe 21. This structure enables the measuring pipe 21 to endure the internal pressure of fluids flowing through it and the compressive force applied it from the upstream and downstream flanges of the piping that conveys the fluid to be measured when the measuring pipe 21 is mounted in the piping. A threaded bore 21b is provided in each of the pair of reinforcing portions 21a for the purpose of mounting insulating spacers 24, which insulate electrodes 23 held within the spacers 24 from the measuring pipe 21. Each threaded bore 21b extends concentrically along the diameter passing through the longitudinal center of the measuring pipe 21 and the lateral center of the corresponding reinforcing portion 21a. Further, as seen in FIG. 2, each reinforcing portion 21a is provided in both sides surfaces thereof with screw receiving holes 21c for mounting a magnetic flux generating unit.

As shown in FIGS. 1(b) and 1(c), an insulating lining 22 is provided over the entire inner surface of the measuring pipe 21. Both ends of the lining 22 are flared to overlap the end faces of the measuring pipe 21. A pair of electrodes 23 are mounted through the insulating spacers 24, which are screwed into the threaded bores 21b of the measuring pipe 21, so that the head of each electrode 23 is exposed where it meets the surface of the lining 22. A pair of magnetic flux generating units 25 are mounted on the exterior surface of the measuring pipe 21 in such a manner that the respective axes of their magnet cores 27 having coils 26 wound thereon are positioned on an imaginary straight line that intersects, at right angles, both the imaginary line that connects the pair of electrodes 23 and the axis of the measuring pipe 21 at a single point of intersection. The radially inward end of each magnet core 27 is brought into close contact with the outer surface of the measuring pipe 21. The pair of magnetic flux generating units 25 generate magnetic field lines that extend orthogonally to both the imaginary line connecting the pair of electrodes 23 and the axis of the measuring pipe 21.

The above assembly comprises the detector body 20, which is housed within an outer casing 30 made of a magnetic metal and having a configuration that enables the whole of the detector body 20 to be accomodated therein with a slight gap left therebetween. In the embodiment shown in FIGS. 1(a), 1(b), and 1(c), the outer casing 30 is split into two portions, a first outer casing portion 28 and a second outer casing portion 29, along a plane that includes the axis of the measuring pipe 21 and the imaginary line connecting the pair of electrodes 23. Each of the portions 28 and 29 is provided with engagement portions 31 against which the end portions of the measuring pipe 21 abut. The detector body 20 is assembled in such a manner that the detector body 20 is fitted into the first casing portion 28, and the second casing portion 29 is then fitted onto the other side of the pipe 21. Then, the end portions of the pipe 21 and the corresponding engagement portions 31 are connected by, for example, welding, and the respective joint ends of the portions 28 and 29 are similarly connected together. Portions 28 and 29 of casing 30 are provided, respectively, with joint ends 30a and 30b, which form lap joints at the connection between portions 28 and 29. Joint ends 30a are on the interior side of casing portion 28, and joint ends 30b are on the exterior side of casing portion 29.

The thus-arranged electromagnetic flow meter in accordance with the first embodiment of the present invention is mounted between respective flanges of upstream and downstream portions of piping (not shown) that conveys the fluid to be measured. The flow meter is tightly clamped by tightening mounting bolts (not shown) that connect together the flanges of the piping outside the outer casing 30. At this time, the compressive force from the flanges is applied to the measuring pipe 21 alone, and no external force is applied to the outer casing 30. When the coils 26 are supplied with an exciting current, the magnetic flux generating units 25 generate magnetic field lines that extend orthogonally to both the imaginary line connecting the pair of electrodes 23 and the axis of the measuring pipe 21. An electromotive force is produced when the fluid conveyed by the piping flows through the flow meter and cuts the magnetic field lines. The electromotive force, which is proportional to the flow velocity, is delivered by lead wires (not shown) to a converter (not shown) where it is converted into a flow rate measurement.

Thus, the electromagnetic flow meter in accordance with the first embodiment of the present invention is arranged such that the whole assembly is completed by housing the detector body 20 within the two-part splittable outer casing 30 after the assembly of the detector body 20 has been completed by mounting the insulating spacers 24 and the electrodes 23 on the measuring pipe 21, forming the insulating lining 22 on the interior the measuring pipe 21, mounting the magnetic flux generating units 25 on the measuring pipe 21, and connecting lead wires extending from the electrodes 23 and the magnetic flux generating units 25 to a converter.

Accordingly, it is easy to assemble the detector body 20, whereas the conventional flow meter of this type requires various elements to be handled inside the outer casing as the detector body and casing are assembled together. Further, it is possible to confirm easily and reliably the assembled condition and the symmetry of the pair of upper and lower magnetic flux generating units 25 with respect to the measuring pipe 21. Because the magnetic flux generating units 25 have a structure that brings the radially inward end of each core 27 into close contact with the outer surface of the measuring pipe 21, it is possible to reduce the distance between the upper and lower magnetic flux generating units 25. Furthermore, since each magnetic flux generating unit 25 is secured to the measuring pipe 21 by screws extending through screw receiving holes 21c, the gap between each of the mounting screws and the hole for the screw can be utilized as an allowance for correction when positional adjustment is effected, which facilitates obtaining the required symmetry of the magnetic flux generating units. Additionally, it is possible to check the assembled detector body 20 before it is housed within the outer casing 30.

Because the compressive forces applied from the piping flanges are borne by the measuring pipe 21, the outer casing 30 is only required to satifactorily house the detector body 20, magnetically shield the magnetic flux generating units 25, and protect the detector body 20 from external disturbances such as, for example, moisture or other substances falling onto the flow meter. For this reason, it is not necessary to have an especially rigid outer casing, and the strength of the outer casing is not required to be as high as in the case of a conventional flow meter. Furthermore, because it is not necessary to provide the outer casing with a special internal space for the assembly of the various functional elements, the outer casing 30 can be arranged to be compact, and the weight thereof can be reduced correspondingly. In addition, the flow meter of the present invention can meet any of the standards (Japanese Industrial Standards, American National Standards and Deutshes Institut fur Normung) for the piping flanges between which the flow meter is to be clamped, because the outer casing 30 can be accomodated in the space within the diameter of the bolt circle formed by the mounting bolts that connect the flanges.

Figures 3A, 3B:
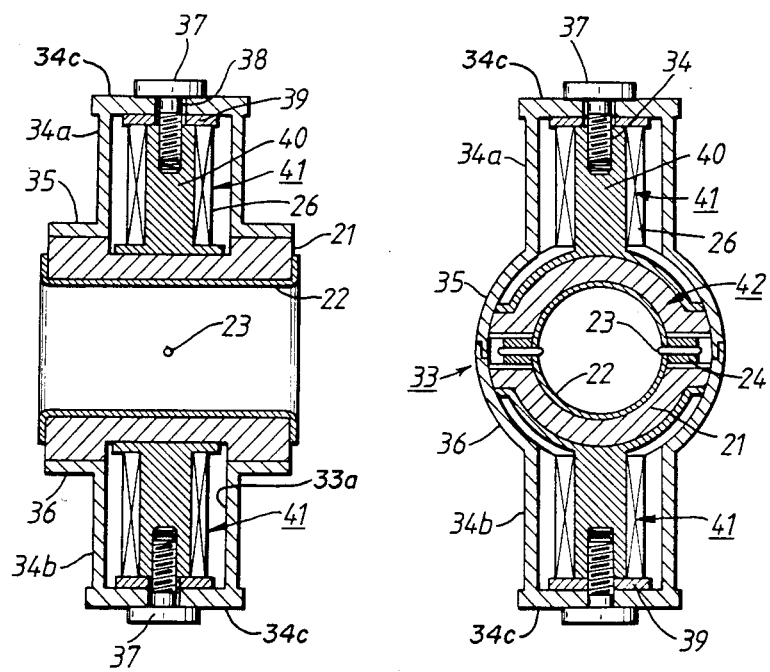
FIG. 3(a) is a sectional view of a second embodiment of the electromagnetic flow meter of the present invention, taken along a vertical plane containing the axis of the measuring pipe.
FIG. 3(b) is a sectional view of the second embodiment of the electromagnetic flow meter of the present invention, taken along a vertical plane perpendicular to the axis of the measuring pipe.
Figure 4:
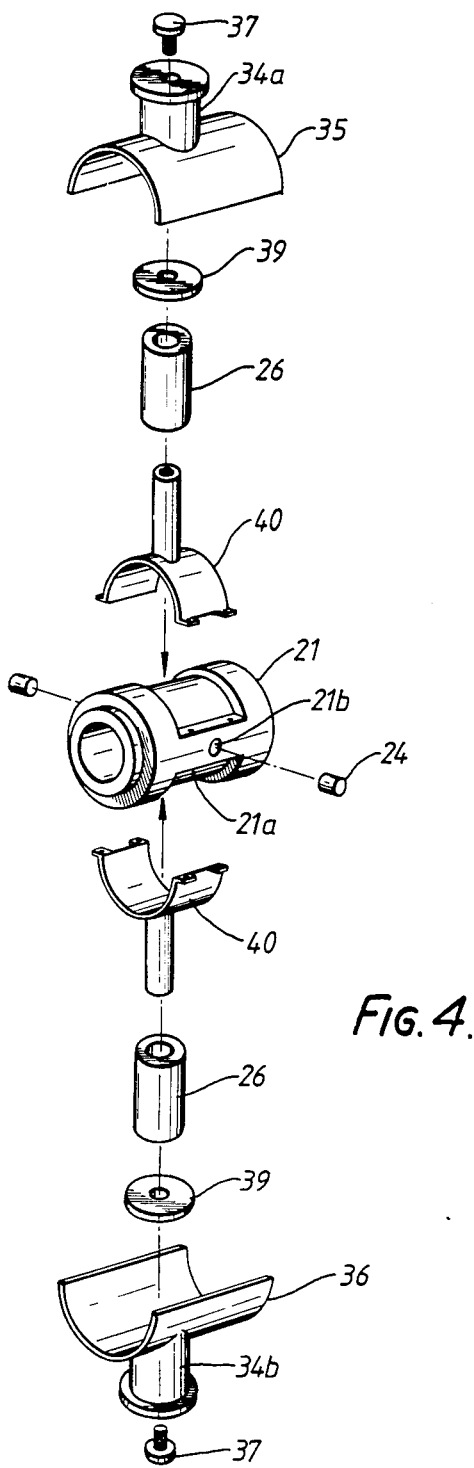
FIG. 4 is an exploded perspective view of the flow meter shown in FIGS. 3(a) and 3(b)

The following is a description of another embodiment of the present invention, which differs from the first embodiment in the method of securing the detector body to the outer casing, with reference to FIGS. 3(a), 3(b), and 4. The portions of this embodiment that are common to the embodiment shown in FIGS. 1(a) through 2 are denoted by the same reference numerals, and detailed description thereof is omitted.

The electromagnetic flow meter embodied in FIGS. 3(a), 3(b), and 4 comprises a detector body 42 housed within an outer casing 33. Detector body 42 includes a measuring pipe 21 having a pair of reinforcing portions 21a including threaded bores 21b for mounting insulating spacers 24, each of which holds an electrode 23 and insulates the corresponding electrode 23 from the measuring pipe 21. The threaded bores 21b are positioned at the longitudinal center of the measuring pipe 21 and extend coaxially with each other along an imaginary line coinciding with the diameter of the pipe 21 that passes through the lateral center of each reinforcing portion 21a. An insulating lining 22 is provided over the entire inner surface of the measuring pipe 21. The electrodes 23 are mounted in the respective insulating spacers 24, which are screwed into the measuring pipe 21, so that the head of each electrode 23 is exposed where it meets the surface of the lining 22. A pair of magnetic flux generating units 41 are secured to the respective side surfaces of the reinforcing portions 21a of the measuring pipe 21 in such a manner that the axis of each magnet core 40 having a coil 26 wound thereon is positioned on an imaginary straight line that intersects, at right angles, both the imaginary line connecting the pair of electrodes 23 and the axis of the pipe 21 at a single point of intersection. The radially inward end of the core 40 is brought into close contact with the outer surface of the measuring pipe 21. The pair of magnetic flux generating units 41 generate magnetic field lines that extend orthogonally to both the imaginary line connecting the pair of electrodes 23 and the axis of the measuring pipe 21. Further, a threaded hole 34 is provided at the free end of each magnet core 40.

The above assembly comprises the detector body 42, which is housed within an outer casing 33. The casing 33 has the general shape of a cylinder into which are fitted the outer peripheral surfaces of the collar-like thick-walled portions formed at both ends of the measuring pipe 21. The casing 33 further includes a pair of magnetic flux generating unit housing portions 34a, 34b in its longitudinally central portion. The housing portions 34a, 34b extend coaxially on an imaginary straight line orthogonal to a plane including the axis of the cylindrical outer casing 33, and each housing portion has the shape of a tube for housing one of the magnetic flux generating units 41. The radially inward end of each portion 34a, 34b is fitted into a bore 33a in the wall of the casing 33, and its radially outward end is closed by a cover 34c. Further, the casing 33 is constituted by two splittable portions, outer casing portions 35 and 36, which are divided along a plane including the axis of the casing 33 and intersecting the respective axes of the housing portions 34a, 34b at right angles. The casing portions 35 and 36 are made of a magnetic metal. A bore 38 for receiving the threaded portion of a fastening member 37 is formed in the cover 34c of each of the magnetic flux generating unit housing portions 34a and 34b. The reference numeral 39 shown in FIGS. 3(a), 3(b) and 4 denotes coil retainers that are interposed between the radially outward portions of the magnetic flux generating units 41 and the inner surfaces of the top portions of the housing portions 34a, 34b when the casing portions 35 and 36 are assembled together. Preferably, O-rings (not shown) are provided between the heads of fastening members 37 and covers 34c to seal the casing 33 around the bores 38.

The thus-arranged electromagnetic flow meter in accordance with the second embodiment of the present invention is assembled as follows. First, the measuring pipe 21 is provided with the insulating lining 22. Then, the insulating spacers 24, the electrodes 23, and the magnetic flux generating units 41 are mounted on the pipe 21, and the lead wires (not shown) extending from the electrodes 23 and the units 41 are properly arranged, thus completing the assembly of the detector body 42. The thus-assembled detector body 42 is covered with the outer casing portions 35 and 36, and the magnet cores 40 and the covers 34c of the magnetic flux generating unit housing portions 34a and 34b of the casing portions 35 and 36 are respectively fastened together by the fastening members 37, so that the corresponding portions are properly aligned with each other. Then, the end portions of the measuring pipe 21 are secured to the end portions of the casing portions 35 and 36 by, for example, welding. Further, the respective joint ends of the casing portions 35 and 36 are similarly secured together by, for example, welding, thus completing the assembly of the second embodiment of the electromagnetic flow meter of this invention.

The electromagnetic flow meter in accordance with the second embodiment of this invention is so constructed that the assembly of the whole of the apparatus is completed by completely assembling the detector body 42 and then covering this detector body with the two-part splittable outer casing 33. In consequence, the lining is provided on the inner surface of the measuring pipe before the electrodes, magnetic flux generating units, and housing portions are applied and, therefore, it is easy to provide the lining. Because it is possible to mount the electrodes and the pair of magnetic flux generating units on the measuring pipe before the casing is applied, the assembling operation is facilitated, and it is possible to confirm the assembled condition, the symmetry of the magnetic flux generating units, and so forth by visual inspection and measurement. Thus, it is possible to increase the degree of accuracy in assembly. Because the end of the magnet core 40 of each magnetic flux generating unit 41 is secured to the side surface of the corresponding reinforcing portion 21a of the measuring pipe 21 by means of screws, it is possible for the pair of the magnetic flux generating units 41 to be disposed close to each other. It is also possible to effect adjustment while visually checking the symmetry by utilizing the clearance between the screw receiving holes 21c and the corresponding screws (not shown). Further, it is easy to handle the lead wires extending from the electrodes 23 and the magnetic flux generating units 25, since this operation is conducted before the outer casing 33 is assembled so as to cover the detector body 42, and it is also possible to accurately and reliably effect wiring and connect the lead wires to predetermined positions.

When the outer casing 33 is mounted on the assembled detector body 42, the two splittable casing portions 35 and 36 are placed on the detector body 42, and the portions 35 and 36 and the magnet cores 40 of the magnetic flux generating units 41 are respectively fastened by means of the fastening members 37. In this state, the corresponding portions can be aligned with each other. It is therefore unnecessary to employ any complicated and expensive jig or tool for fastening the casing portions 35 and 36, which fact leads to an increase in productivity.

Further, the fastening members 37 also serve as auxiliary magnetic poles that fill the gap between the outer casing 33 and the magnet cores 40 of the magnetic flux generating units 41. It is therefore possible to reduce the number of turns of the coils 26 in the magnetic flux generating units 41, the applied current required, and so forth. Furthermore, the measuring pipe 21 is provided with a strength high enough to withstand the compression applied in the direction of the axis of the pipe 21. The pipe 21 bears the entire compressive force applied from the flanges of the piping between which the flow meter is clamped. For this reason, it is necessary for the outer casing 33 to serve only as a magnetic shield against the magnetic flux generating units 41, as a feedback magnetic path, and to protect the detector body 42 from external disturbances, such as moisture or other substances falling onto the flow meter. Accordingly, the weight of the casing 33 can be reduced. As a whole, these advantageous effects make it possible to reduce the size and weight of the electromagnetic flow meter. To comply with any of the standards (Japanese Industrial Standards, American National Standards and Deutshes Institut fur Normung) for the piping flanges between which the flow meter is to be clamped, the outer casing 33 can be accomodated in a space within the diameter of the bolt circle formed by the fastening bolts connecting the flanges. Thus, the flow meter according to the present invention is applicable to any of these standards. Since the magnet cores 40 and the outer casing 33 are connected together by means of the fastening members 37 in the embodiment shown in FIGS. 3(a), 3(b), and 4, the efficiency with which magnetic path is formed is higher than that in the case of the embodiment shown in FIGS. 1(a) through 1(c).

Figure 5A:
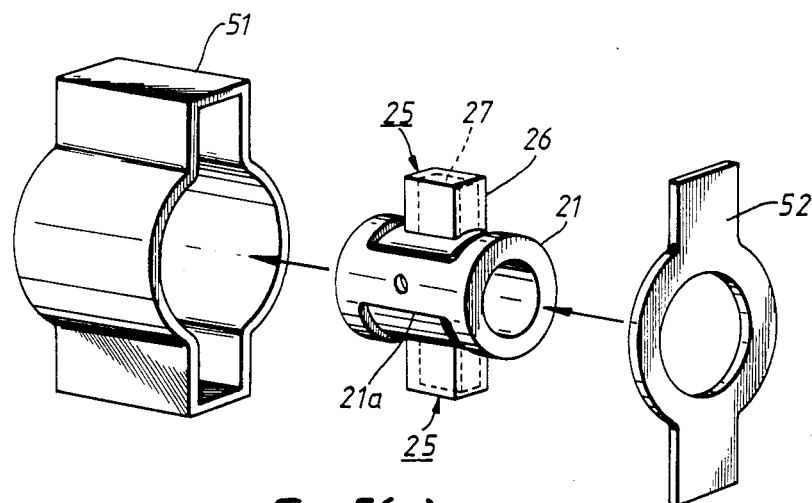
FIG. 5(a) is an exploded perspective view of a third embodiment of the electromagnetic flow meter of the present invention wherein the way in which the outer casing is split is modified.
Figure 5B:
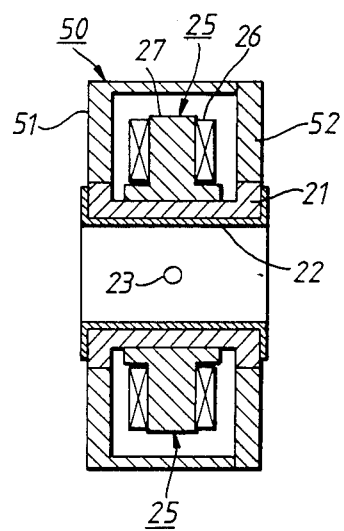
FIG. 5(b) is a sectional view of the flow meter of FIG. 5(a), taken along a vertical plane containing the axis of the measuring pipe.
Figure 5C:
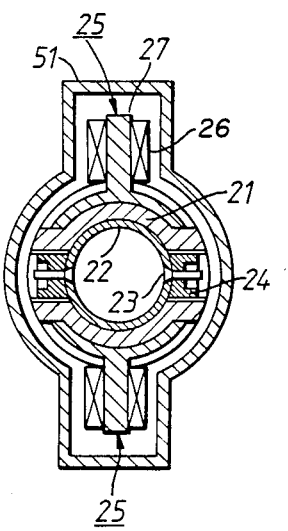
FIG. 5(c) is a sectional view of the flow meter of FIG. 5(a), taken along a vertical plane perpendicular to the axis of the measuring pipe.

Although in the first and second embodiments the outer casing is split along a path including the axis of the measuring pipe 21 and the electrodes 23, it is to be noted that it is not always necessary to split the outer casing in this way. For example, the outer casing may be split in a manner such as that shown in FIGS. 5(a), 5(b), and 5(c) in which an outer casing 50 is split into outer casing portions 51 and 52. As shown, the outer casing may be split at a right-hand portion (as viewed in FIGS. 5(a) and 5(b) by a plane orthogonal to the axis of the measuring pipe 21.

Figure 6A:
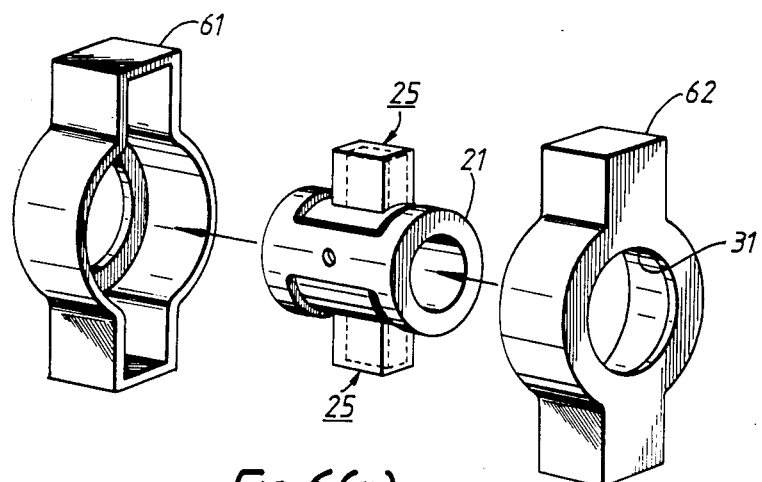
FIG. 6(a) is an exploded perspective view of a fourth embodiment of the electromagnetic flow meter of the present invention, wherein the way in which the outer casing is split is further modified.
Figures 6B, 6C:
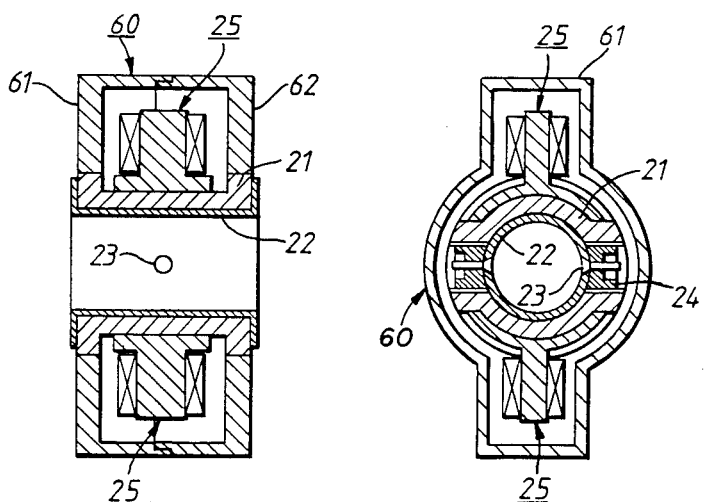
FIG. 6(b) is a sectional view of the flow meter shown in FIG. 6(a), taken along a vertical plane containing the axis of the measuring pipe.
FIG. 6(c) is a sectional view of the flow meter of FIG. 6(a), taken along a vertical plane perpendicular to the axis of the measuring pipe.

Further, the arrangement of the outer casing may be such that, as shown in FIGS. 6(a), 6(b), and 6(c), an outer casing 60 is split into two portions 61 and 62. As shown, the outer casing may be split along a plane that is orthogonal to the axis of the measuring pipe 21 and includes the imaginary line connecting the electrodes 23.

Figure 7A:
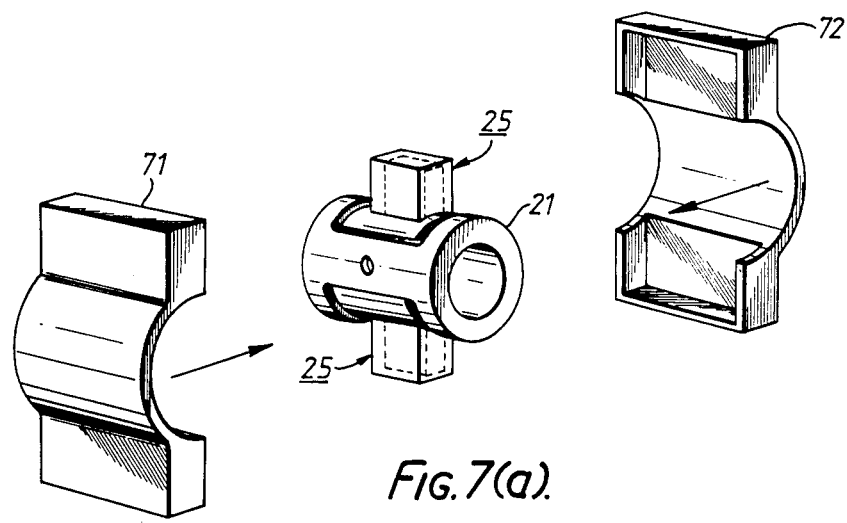
FIG. 7(a) is an exploded perspective view of a fifth embodiment of the electromagnetic flow meter of the present invention, wherein the way in which the outer casing is split is further modified.
Figures 7B, 7C:
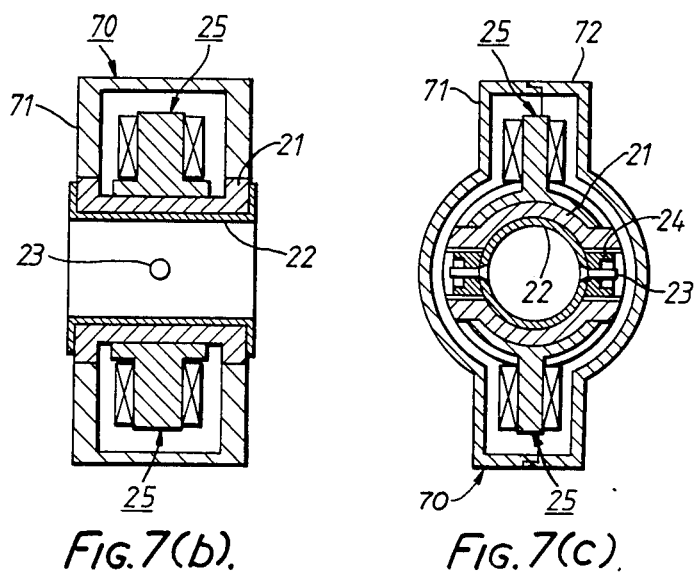
FIG. 7(b) is a sectional view of the flow meter of FIG. 7(a), taken along a vertical plane containing the axis of the measuring pipe.
FIG. 7(c) is a sectional view of the flow meter of FIG. 7(a), taken along a vertical plane perpendicular to the axis of the measuring pipe.

FIGS. 7(a), 7(b), and 7(c) show a further embodiment including an outer casing 70, which is split into outer casing portions 71 and 72 along a plane that is orthogonal to the imaginary line connecting the electrodes 23 and includes the axis of the measuring pipe 21.

Moreover, in each of the above embodiments, the outer casing may be made of a synthetic resin, for example, fiber reinforced plastic, in place of a magnetic metal. In such a case, the inner surface of the outer casing is coated with a magnetic metal, so that the outer casing provides a magnetic shielding function. Furthermore, the magnetic flux generating unit and the measuring pipe may be secured together by welding or other means of bonding in place of threaded fasteners.

The measuring pipe also may be made of a ceramic material in addition to non-magnetic metals. In such a case, it is not necessary to provide any insulating lining on the inner surface of the pipe.

Although the embodiment shown in FIGS. 3(a), 3(b), and 4 employs O-rings for sealing the gaps between the fastening members 37 and the covers 34c of the magnetic flux generating unit housing portions 34a, 34b of the outer casing 33, the gaps may be sealed by means of welding or bonding (using, for example, a resin adhesive or a brazing material) after tightening the fastening members 37, in place of the O-rings. In addition, it is not always necessary to employ the coil retainers 39.

Figure 8:
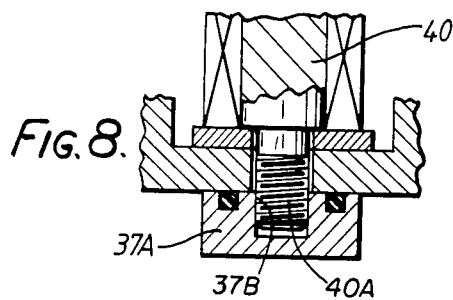
FIG. 8 is a sectional view of a portion of the electromagnetic flow meter of FIG. 4, in which the fastening members for securing together the outer casing and the cores are modified.

Further, each of the fastening members 37 shown in FIGS. 3(a) and 3(b) may be replaced by a fastening member 37A having an internally-threaded hole 37B which does not extend completely through the fastening member, as shown in FIG. 8. In such a case, the end portion of each magnet core 40 has an extended portion 40A provided with an external thread so that this threaded end portion threadably engages the internally threaded hole of the fastening member 37A.

Figure 9:
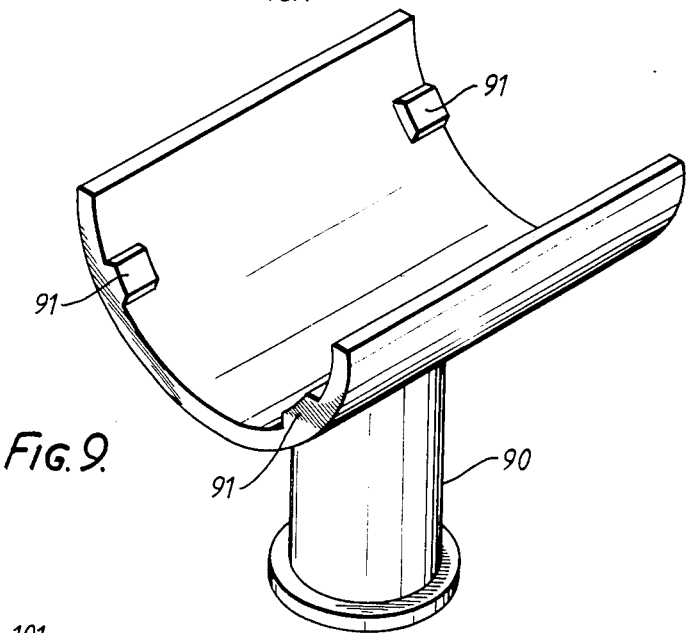
FIG. 9 is a perspective view of the electromagnetic flow meter of FIGS. 1(a) or 4, in which the outer casing portions are modified.
Figure 10:
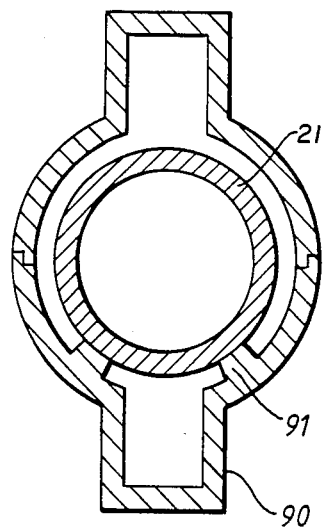
FIG. 10 is a sectional view showing the arrangement for mounting the measuring pipe in the outer casing portions of FIG. 9.

FIG. 9 shows an embodiment in which an outer casing portion 90 is provided with projections 91 that abut against the measuring pipe 21. In this case, it is possible for the respective axes of the outer casing and the measuring pipe to be aligned with each other without the need for any special jig or tool for effecting alignment, as shown in FIG. 10.

Figure 11:
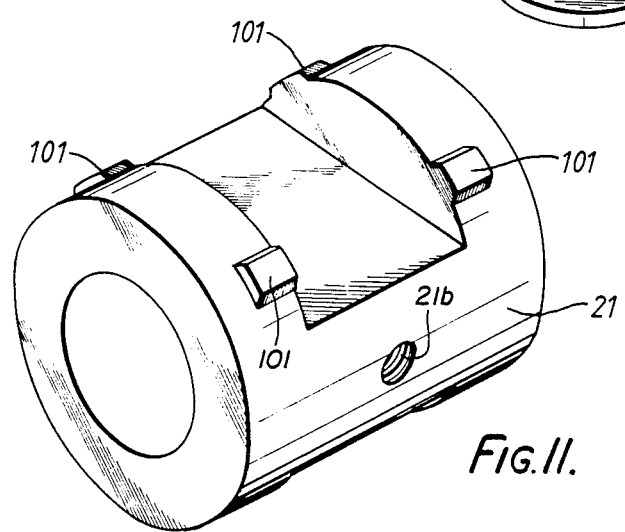
FIG. 11 is a perspective view of a measuring pipe in accordance with a still further embodiment.
Figure 12:
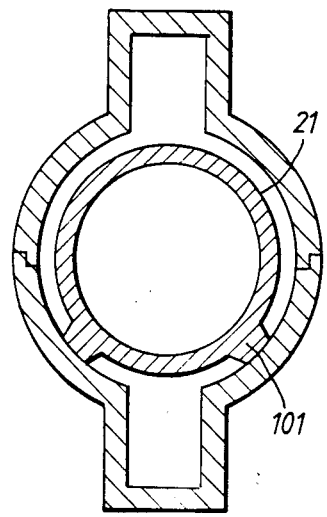
FIG. 12 is a sectional view showing the arrangement for mounting the measuring pipe of FIG. 11 in the outer casing portions.

FIGS. 11 and 12 show an arrangement in which projections 101 are provided on the exterior surface of the measuring pipe 21 to abut against the inner surface of the outer casing.

Because the projections that enable the respective axes of the outer casing and the measuring pipe to be easily aligned with each other are provided on either the outer casing or the measuring pipe, the symmetry required for an electromagnetic flow meter is accurately maintained, and the assembling efficiency is improved. Thus, it is possible to readily produce a highly accurate and inexpensive electromagnetic flow meter.

Figure 13:
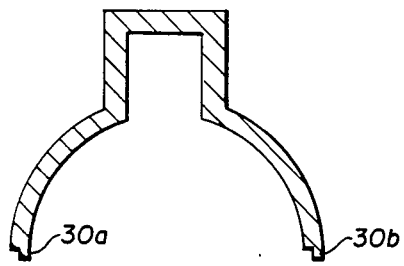
FIG. 13 is a sectional view of an outer casing portion in accordance with a still further embodiment of the present invention.

FIG. 13 shows another structure of an outer casing portion. With this structure, it is possible to employ one type of casing portion that can be used, for example, as both first portion 28 and second portion 29 of the flow meter of FIG. 1(a). The outer casing portion of FIG. 13 includes both an interior joint end 30a and an exterior joint end 30b.

It will be apparent to those skilled in the art that other modifications and variations can be made in the electromagnetic flow meter of this invention. The invention in its broader aspects, therefore, is not limited to the specific details and illustrated examples shown and described. Accordingly, departure can be made from such details without departing from the spirit of applicant's general inventive concept.

What is claimed is:

1. An electromagnetic flow meter is interposable between the flanged ends of upstream and downstream pipes conveying a fluid whose flow rate is to be measured, said flow meter comprising:
 a detector body including
  a measuring pipe made of a non-magnetic material having longitudinal end faces contacting said flanged ends of said conveying pipes and having a pair of diametrally opposed reinforcing portions parallel to the axis of said measuring pipe, said fluid flowing through said measuring pipe along said axis of said measuring pipe,
  a pair of electrodes mounted in said measuring pipe and positioned on a first imaginary straight line orthogonal to said axis of said measuring pipe and passing through said reinforcing portions of said measuring pipe, said electrodes contacting said fluid flowing through said measuring pipe, and
  a pair of magnetic flux generating units mounted on the outer surface of said measuring pipe, each of said magnetic flux generating units including a magnet core having coils wound thereon, each of said magnet cores having an axis positioned on a second imaginary straight line that intersects, at right angles, both said first imaginary line connecting said electrodes and said axis of said measuring pipe at a common point of intersection, said magnetic flux generating units generating magnetic field lines orthogonal to said first imaginary line and said axis of said measuring pipe; and an outer casing enclosing the radial portion of sid detector body, said outer casing having longitudinal end faces substantially aligned with said longitudinal end faces of said measuring pipe.

2. The electromagnetic flow meter of claim 1, wherein said outer casing is splittable into a plurality of casing portions.

3. The electromagnetic flow meter of claim 1, wherein said outer casing is split into two portions along a plane that is orthogonal to said axis of said measuring pipe.

4. The electromagnetic flow meter of claim 1, wherein said outer casing is split into two portions along a plane that is parallel with a plane including said axis of said measuring pipe and said first imaginary line connecting said electrodes.

5. The electromagnetic flow meter of claim 1, wherein said outer casing is split into two portions along a plane that is parallel with a plane including said axis of said measuring pipe and said second imaginary line.

6. The electromagnetic flow meter of claim 1, wherein said outer casing and said magnetic flux generating units are connected together by fastening members.

7. The electromagnetic flow meter of claim 1, wherein said magnet cores are threadably engaged with said outer casing.

8. The electromagnetic flow meter of claim 1, wherein said magnet cores are secured to said reinforcing portions of said measuring pipe.

9. The electromagnetic flow meter of claim 8, wherein said magnet cores are threadably fastened to said reinforcing portions of said measuring pipe.

10. An electromagnetic flow meter interposable between the flanged ends of upstream and downstream pipes conveying a fluid whose flow rate is to be measured, said flow meter comprising:

a detector body including a measuring pipe made of a non-magnetic material having longitudinal end faces contacting said flanged ends of said conveying pipes, said fluid flowing through said measuring pipe along the axis of said measuring pipe, a pair of electrodes mounted in said measuring pipe and positioned on a first imaginary straight line orthogonal to said axis of said measuring pipe, said electrodes contacting said fluid flowing through said measuring pipe, and a pair of magnetic flux generating units mounted on the outer surface of said measuring pipe, each of said magnetic flux generating units including a magnet core having coils wound thereon, each of said magnet cores having an axis positioned on a second imaginary straight line that intersects, at right angles, both said imaginary line connecting said electrodes and said axis of said measuring pipe at a common point of intersection, said magnetic flux generating units generating magnetic field lines orthogonal to said first imaginary line and said axis of said measuring pipe; and an outer casing enclosing the radial portion of said detector body, said outer casing having longitudinal end faces substantially aligned with said longitudinal end faces of said measuring pipe and an inner surface including a plurality of radially inward projections, said measuring pipe abutting against said projections.

11. An electromagnetic flow meter interposable between the flanged ends of upstream and downstream pipes conveying a fluid whose flow rate is to be measured, said flow meter comprising:

a detector body including a measuring pipe made of a non-magnetic material having longitudinal end faces contacting said flanged ends of said conveying pipes and a plurality of radially outward projections, said fluid flowing through said measuring pipe along the axis of said measuring pipe, a pair of electrodes mounted in said measuring pipe and positioned on a first imaginary straight line orthogonal to said axis of said measuring pipe, said electrodes contacting said fluid flowing through said measuring pipe, and a pair of magnetic flux generating units mounted on the outer surface of said measuring pipe, each of said magnetic flux generating units including a magnet core having coils wound thereon, each of said magnet cores having an axis positioned on a second imaginary straight line that intersects, at right angles, both said first imaginary line connecting said electrodes and said axis of said measuring pipe at a common point of intersection, said magnetic flux generating units generating magnetic field lines orthogonal to said first imaginary line and said axis of said measuring pipe; and an outer casing enclosing the radial portion of said detector body, said outer casing having longitudinal end faces substantially aligned with said longitudinal end faces of said measuring pipe, and said outer casing abutting against said radially outward projections of said measuring pipe.

* * * * *